(12) United States Patent
Sunada

(10) Patent No.: US 7,688,343 B2
(45) Date of Patent: Mar. 30, 2010

(54) DEVICE FOR MEASURING SHEET LENGTH AND IMAGE FORMING APPARATUS

(75) Inventor: Hidenori Sunada, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 662 days.

(21) Appl. No.: 11/609,730

(22) Filed: Dec. 12, 2006

(65) Prior Publication Data

US 2007/0133069 A1    Jun. 14, 2007

(30) Foreign Application Priority Data

Dec. 14, 2005   (JP)   .............................. 2005-360654

(51) Int. Cl.
*B41J 2/435* (2006.01)
(52) U.S. Cl. ...................... 347/262; 347/264
(58) Field of Classification Search ................ 347/262, 347/264; 359/216.1; 271/227, 258.01, 259, 271/265.01, 265.02
See application file for complete search history.

(56) References Cited

U.S. PATENT DOCUMENTS 5,291,225 A    3/1994   Saito
6,222,174 B1   4/2001   Tullis et al.
6,834,853 B2 * 12/2004  Trovinger et al. ............ 271/227
7,130,097 B2 * 10/2006  Higashi et al. ........... 359/216.1

FOREIGN PATENT DOCUMENTS

| JP | 59019625 A | * | 2/1984 |
| JP | 63-230463 | | 9/1988 |
| JP | 03-172255 | | 7/1991 |
| JP | 04-121345 | | 4/1992 |
| JP | 05-008460 | | 1/1993 |
| JP | 2000-270169 | | 9/2000 |
| JP | 2001-122450 | | 5/2001 |
| JP | 2004045476 A | * | 2/2004 |
| JP | 2005-274919 | | 10/2005 |

* cited by examiner

*Primary Examiner*—Hai C Pham
(74) *Attorney, Agent, or Firm*—Canon USA Inc IP Div

(57) ABSTRACT

A measuring device for measuring a length of a sheet includes a sheet-carrying unit for carrying a sheet, a reading unit having an area sensor and configured to repeatedly read the surface of the sheet from the leading end to the trailing end of the sheet while the sheet is being carried by the sheet-carrying unit, and a measuring unit for measuring the length of the sheet in the carrying direction on the basis of information regarding the sheet surface that is repeatedly read by the reading unit.

7 Claims, 11 Drawing Sheets

FRONT VIEW    SIDE VIEW

TOP VIEW

FIG. 9

READ IMAGE

| A11 | A12 | A13 | A14 | A15 | A16 | A17 |
| A21 | A22 | A23 | A24 | A25 | A26 | A27 |
| A31 | A32 | A33 | A34 | A35 | A36 | A37 |
| A41 | A42 | A43 | A44 | A45 | A46 | A47 |
| A51 | A52 | A53 | A54 | A55 | A56 | A57 |
| A61 | A62 | A63 | A64 | A65 | A66 | A67 |
| A71 | A72 | A73 | A74 | A75 | A76 | A77 |

COMPARATIVE MATRIX

| B11 | B12 | B13 | B14 | B15 | B16 | B17 |
| B21 | B22 | B23 | B24 | B25 | B26 | B27 |
| B31 | B32 | B33 | B34 | B35 | B36 | B37 |
| B41 | B42 | B43 | B44 | B45 | B46 | B47 |
| B51 | B52 | B53 | B54 | B55 | B56 | B57 |
| B61 | B62 | B63 | B64 | B65 | B66 | B67 |
| B71 | B72 | B73 | B74 | B75 | B76 | B77 |

$$\sum\left(\sum(Bxy-Axy)^2\right)$$

DEVICE FOR MEASURING SHEET LENGTH AND IMAGE FORMING APPARATUS

BACKGROUND OF THE INVENTION

1. Field of the Invention

The present invention relates to devices for measuring lengths of sheets while the sheets are carried, and relates to image forming apparatuses such as copying machines and printers including the measuring devices.

2. Description of the Related Art

According to known methods for forming images on both sides of sheets in image forming apparatuses, toner images are first formed and fixed on first surfaces of the sheets. The sheets are then sent to double-sided printing paths so as to be reversed, and toner images are formed and fixed on second surfaces.

However, when the sheets are heated and pressurized during fixing of the toner images on the first surfaces, moisture content in the sheets is vaporized and fibers are extended, resulting in subtle changes in the size of the sheets after the fixation. Therefore, in order to adjust the positions of the images on the back surfaces of the sheets relative to those on the front surfaces, it is necessary for the image forming apparatuses to form images suitable for the image sizes on the second surfaces changed from those on the first surfaces after the passage of the sheets through fixing units.

In order to support the above-described phenomenon, an image forming apparatus that changes image sizes on second surfaces of sheets according to the change in the sheet size caused by the passage of the sheets through a fixing unit is disclosed in Japanese Patent Laid-Open No. 5-008460.

The image forming apparatus disclosed in the Japanese Patent Laid-Open No. 5-008460 defines variations in sheet size as a predetermined value, although the amount of vaporization of the moisture content in the sheets and the amount of elongation of the fibers are practically changed according to types of sheets and fixing conditions. That is, since the variations in sheet size are changed according to various conditions, the image forming apparatus needs to measure the actual sizes of the sheets so as to obtain more accurate variations.

An image forming apparatus measuring actual sizes of sheets is disclosed in Japanese Patent Laid-Open No. 3-172255. The image forming apparatus measures time from start of driving registration rollers to detection of the trailing end of a sheet using a sheet-detecting sensor, and converts the time into a length using carrying speed. Moreover, Japanese Patent Laid-Open No. 4-121345 (corresponding to U.S. Pat. No. 5,291,225) discloses an image forming apparatus that converts the number of clock pulses for driving a feed motor into a length by multiplying the clock pulses by the carrying speed of the sheet, the clock pulses being counted during a period between detection of the leading end and the trailing end of a sheet using a sheet-detecting sensor.

However, the carrying speed of the sheet is not simply determined by only the rotating speeds of the registration rollers or those of carrying rollers driven by the feed motor, and errors may be generated due to eccentricity or abrasion of the rollers. Therefore, when the rollers slip during carrying of a sheet, for example, the sheet size is not accurately detected in the technologies disclosed in Japanese Patent Laid-Open Nos. 3-172255 and 4-121345.

SUMMARY OF THE INVENTION

The present invention is directed to a device capable of measuring a sheet length with high accuracy, and is directed to an image forming apparatus including the same. Moreover, the present invention is directed to an image forming apparatus capable of adjusting the position of an image on the back surface of a sheet with respect to that on the front surface even when the length of the sheet is changed after fixation of the images.

A measuring device for measuring a length of a sheet according to an aspect of the present invention includes a sheet-carrying unit configured to carry a sheet in a sheet carrying direction; a reading unit including an area sensor and configured to repeatedly read the surface of the sheet from the leading end to the trailing end of the sheet while the sheet is being carried by the sheet-carrying unit; and a measuring unit measuring the length of the sheet in the carrying direction on the basis of information regarding the sheet surface that is repeatedly read by the reading unit.

Moreover, an image forming apparatus according to another aspect of the present invention includes the measuring device described above; an image-correcting unit configured to correct an image to be formed on the sheet; an image-forming unit configured to form a toner image on the sheet on the basis of the image corrected by the image-correcting unit; and a fixing unit fixing the toner image formed on the sheet by the image-forming unit to the sheet. The measuring unit measures the length of the sheet in the carrying direction before and after the sheet passes through the fixing unit, and the image-correcting unit determines a correction factor according to the length of the sheet in the carrying direction measured by the measuring unit before and after the sheet passes through the fixing unit.

Further features of the present invention will become apparent from the following description of exemplary embodiments with reference to the attached drawings.

BRIEF DESCRIPTION OF THE DRAWINGS

FIG. 9 illustrates comparison between images.

DESCRIPTION OF THE EMBODIMENTS

A digital copier will be described as an example of image forming apparatuses according to exemplary embodiments of the present invention.

First Exemplary Embodiment

Figure 1:
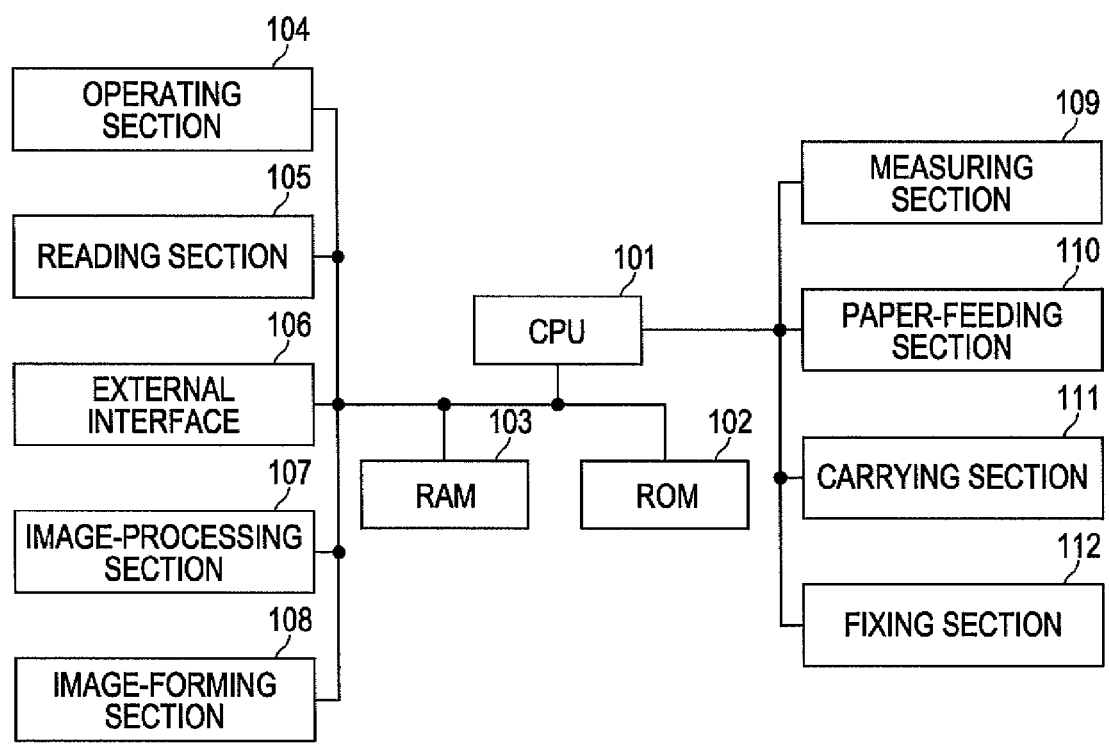
FIG. 1 is a block diagram illustrating functions of a digital copier according to a first exemplary embodiment of the present invention.

First, a first exemplary embodiment will be described. FIG. 1 illustrates functions of a digital copier to which this exemplary embodiment is applied.

A CPU 101 controls the entire digital copier, and a ROM 102 stores control contents to be executed by the CPU 101. A RAM 103 is used as a working space required for the control of the digital copier. In addition, the RAM 103 is used for storing digital images obtained when original documents are read by a reading section 105 and digital images and the like transmitted from outside the digital copier via an external interface 106. Moreover, the RAM 103 is used by an image-processing section 107 as a working space for processing digital images obtained via the reading section 105 and the external interface 106. Users can set copy jobs to be executed by the digital copier via an operating section 104. Users can also execute print jobs via the external interface 106 instead of using the operating section 104.

The reading section 105 reads and digitalizes images of original documents placed on a platen glass of the digital copier according to the settings input via the operating section 104, and stores the images in the RAM 103. The external interface 106 is connected to a network such as TCP/IP so as to be able to receive commands for executing print jobs from computers connected to the network, or conversely, to be able to communicate information in the digital copier to the computers. The image-processing section 107 adds required image processing to digital images according to the settings of copy jobs such as single-sided printing and two-sided printing input via the operating section 104 and according to the contents of the images read by the reading section 105, and then stores the digital images to be formed in the RAM 103.

An image-forming section 108 forms toner images from the digital images stored in the RAM 103. On the other hand, sheets stored in the digital copier are fed by a paper-feeding section 110, and subsequently, carried to the image-forming section 108 by a carrying section 111. Thus, the toner images formed in the image-forming section 108 are transferred to the sheets.

The toner images transferred to the sheets are fixed on the sheets at a fixing section 112. The sheets are discharged from the copier, or are carried again to the image-forming section 108 by the carrying section 111 for formation of second images. A measuring section 109 for measuring the lengths of the sheets is disposed on a carrying path from the fixing section 112 to the image-forming section 108 so as to measure the lengths of the sheets after fixation.

Figure 2:
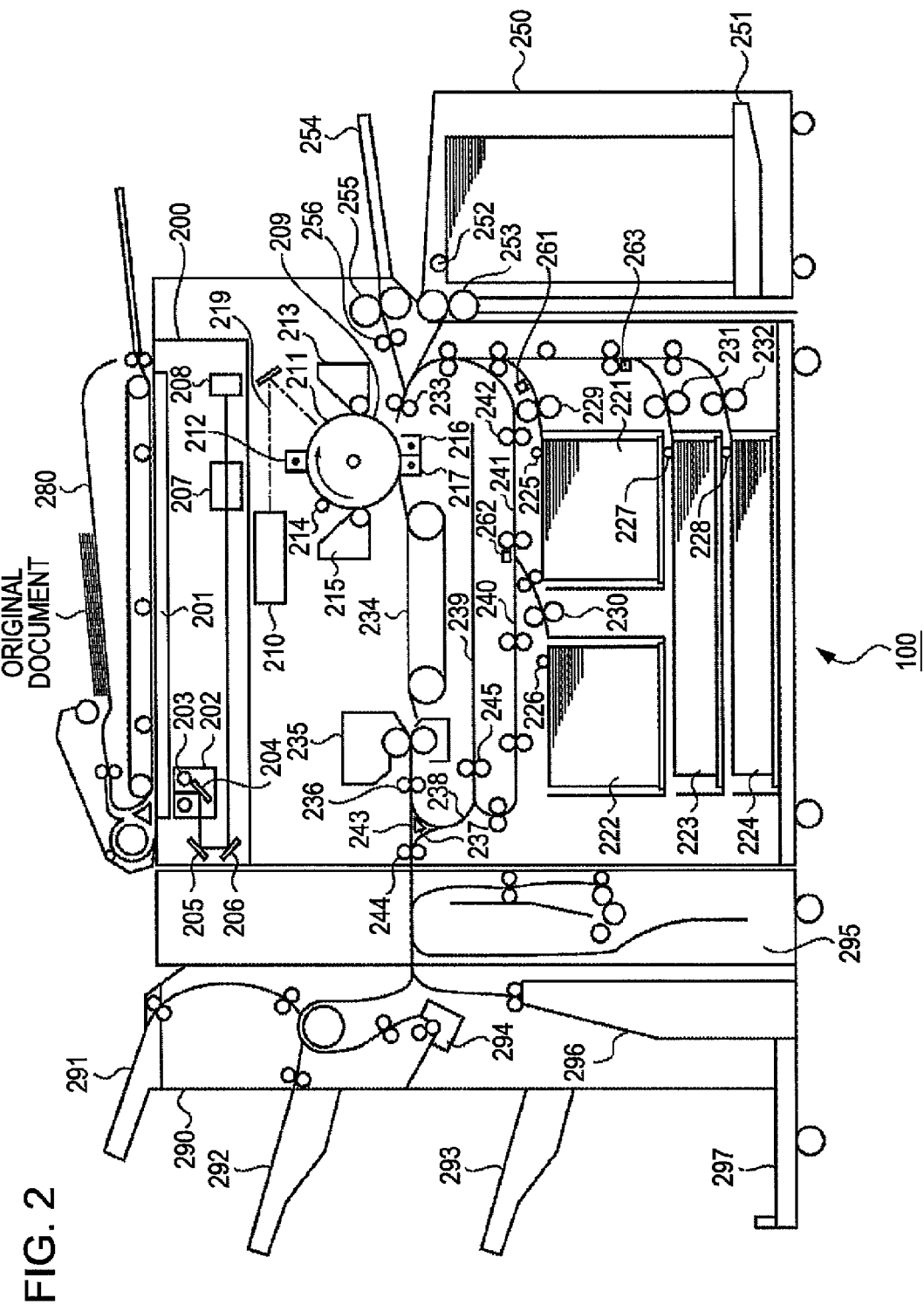
FIG. 2 is a schematic cross-sectional view of the digital copier.

FIG. 2 illustrates a structure of a digital copier. The digital copier includes a body 100 and an automatic document feeder (ADF) 280. A reading unit 200 disposed in the body 100 includes a platen glass 201, a scanner 202, a document-illuminating lamp 203, scanning mirrors 204 to 206, and the like. The scanner is reciprocated in predetermined directions by a motor (not shown) so as to scan an original document. Light reflected from the original document passes through a lens 207 via the scanning mirrors 204 to 206, and is focused on a CCD sensor in an image sensor 208.

An image-forming unit 209 includes a photosensitive drum 211, a primary charging device 212, a developing device 213, a charging device 216 for transfer operation, a pre-exposure lamp 214, a cleaning device 215, and a fixing device 235. An exposure-controlling unit 210 includes a laser, a polygon scanner, and the like, and emits laser beams 219 to the photosensitive drum 211, the laser beams being modulated on the basis of image signals converted into electrical signals in the image sensor 208 and subjected to predetermined image processing (described below). The photosensitive drum 211 is rotated by a motor (not shown) in the direction of an arrow shown in the drawing. After the surface of the photosensitive drum 211 is charged to a desired potential by the primary charging device 212, the photosensitive drum 211 is irradiated with the laser beams 219 emitted from the exposure-controlling unit 210 such that an electrostatic latent image is formed thereon. The electrostatic latent image formed on the photosensitive drum 211 is developed by the developing device 213, and is turned into a visible toner image.

On the other hand, a recording sheet is supplied from a right cassette deck 221, a left cassette deck 222, an upper cassette 223, or a lower cassette 224 using a pickup roller 225, 226, 227, or 228, respectively. The recording sheet supplied from the right cassette deck 221, the left cassette deck 222, the upper cassette 223, or the lower cassette 224 is sent to a carrying path by paper-feeding rollers 229, 230, 231, or 232, respectively. The recording sheet is then sent to a transferring unit by registration rollers 233 such that the toner image formed on the photosensitive drum 211 is transferred to the recording sheet by the charging device 216 for transfer operation. Toner remaining on the photosensitive drum 211 after the transfer operation is removed by the cleaning device 215, and residual electric charges are removed by the pre-exposure lamp 214.

The recording sheet after the transfer operation is separated from the photosensitive drum 211 by a charging device 217 for separation, and sent to the fixing device 235 by a carrying belt 234. The recording sheet sent to the fixing device 235 is heated and pressurized such that the toner is fixed on the sheet, and discharged to outside the body 100 by internal paper-ejecting rollers 236 and ejecting rollers 244.

A deck 250 capable of accommodating four thousand recording sheets is attached to the body 100. A lifter 251 of the deck 250 is raised according to the volume of the recording sheets such that a pickup roller 252 is always in contact with the recording sheets. The recording sheets are sent to the carrying path by paper-feeding rollers 253.

Moreover, a multipurpose manual bypass 254 capable of accommodating one hundred recording sheets is attached to the body 100. The recording sheets are carried to the registration rollers 233 by paper-feeding rollers 255 and carrying rollers 256.

A paper-ejecting flapper 237 switches between a carrying path 238 and an ejecting path 243. A lower carrying path 240 turns the recording sheet fed from the internal paper-ejecting rollers 236 upside down via a reversing path 239, and guides the recording sheet to a paper-refeeding path 241. Recording sheets supplied from the left cassette deck 222 by the paper-feeding rollers 230 are also guided to the paper-refeeding path 241.

Paper-refeeding rollers 242 feed the recording sheet again to the image-forming unit 209. The ejecting rollers 244 are disposed adjacent to the paper-ejecting flapper 237, and discharge the recording sheet carried on the ejecting path 243 switched to by the paper-ejecting flapper 237 to outside the body. During two-sided recording (two-sided copying), the paper-ejecting flapper 237 is lifted upward. Thus, the prerecorded sheet is guided to the paper-refeeding path 241 via the reversing path 239 and the lower carrying path 240. At this time, reversing rollers 245 draw the recording sheet into the reversing path 239, and then rotate in the opposite direction so as to send out the recording sheet to the lower carrying path 240. When the recording sheet is reversed before being discharged from the body, the paper-ejecting flapper 237 is lifted upward, and the reversing rollers 245 draw the recording sheet into the reversing path 239 such that the trailing end of the recording sheet partly remains. Then, the reversing rollers 245 are rotated in the opposite direction so as to send out the reversed recording sheet toward the ejecting rollers 244.

Three image-sensing units 261, 262, and 263 are disposed at a carrying path from the right cassette deck 221, a carrying path from the left cassette deck 222, and a meeting point of carrying paths from the upper and lower cassettes 223 and 224, respectively. The image-sensing units 261, 262, and 263 are area sensors, and can read two-dimensional images.

The image-sensing units 261, 262, and 263 detect the lengths of recording sheets. The image-sensing unit 261 detects the lengths of the sheets supplied from the right cassette deck in the carrying direction, and the image-sensing unit 262 detects the lengths of the sheets supplied from the left cassette deck and those passing through the paper-refeeding path for two-sided printing in the carrying direction. Moreover, the image-sensing unit 263 detects the lengths of the sheets supplied from the upper and the lower cassettes in the carrying direction. The image-sensing units 261, 262, and 263 each include a plurality of image sensors so as to be capable of reading the surfaces of the sheets passing through the carrying paths.

An output-handling apparatus 290 aligns and binds the recording sheets discharged from the body 100. The recording sheets discharged one by one are stacked and aligned on a handling tray 294. The output-handling apparatus 290 staples bundles of the recording sheets on the handling tray 294, and discharges the bundles to a paper output tray 292 or 293. The paper output tray 293 is moved up and down by a motor (not shown). The paper output tray 293 is moved to the position of the handling tray 294 before image-forming operation, and is lowered as the discharged recording sheets are stacked such that the height of the top recording sheet corresponds to the position of the handling tray 294. Furthermore, a sheet tray 291 accommodates delimiter sheets that are inserted between the discharged recording sheets, and a Z-folding device 295 folds the discharged recording sheets into Z shapes. Moreover, a bookbinding device 296 folds bundles of the discharged recording sheets in the center, and staples the bundles. The bound books are discharged to an output tray 297.

Figure 3:
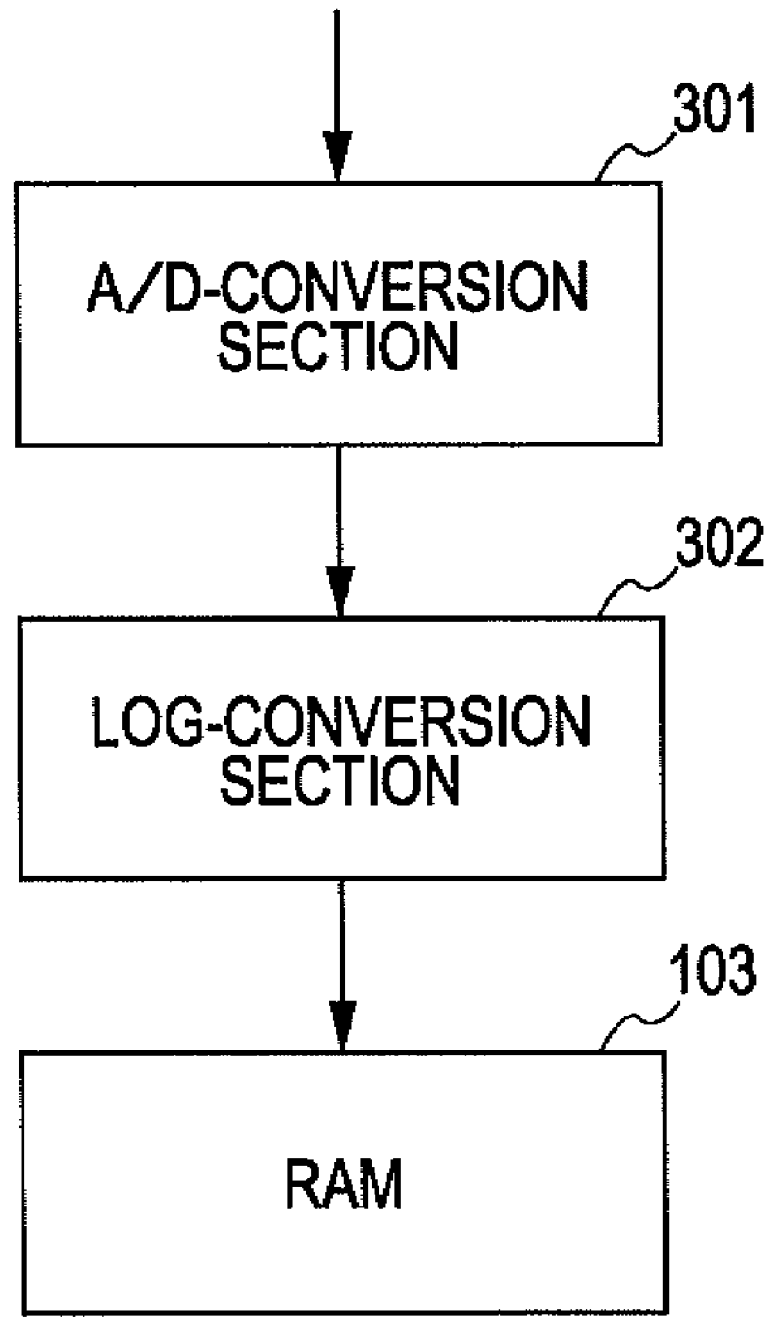
FIG. 3 is a block diagram of an image-processing section.
Figure 4:
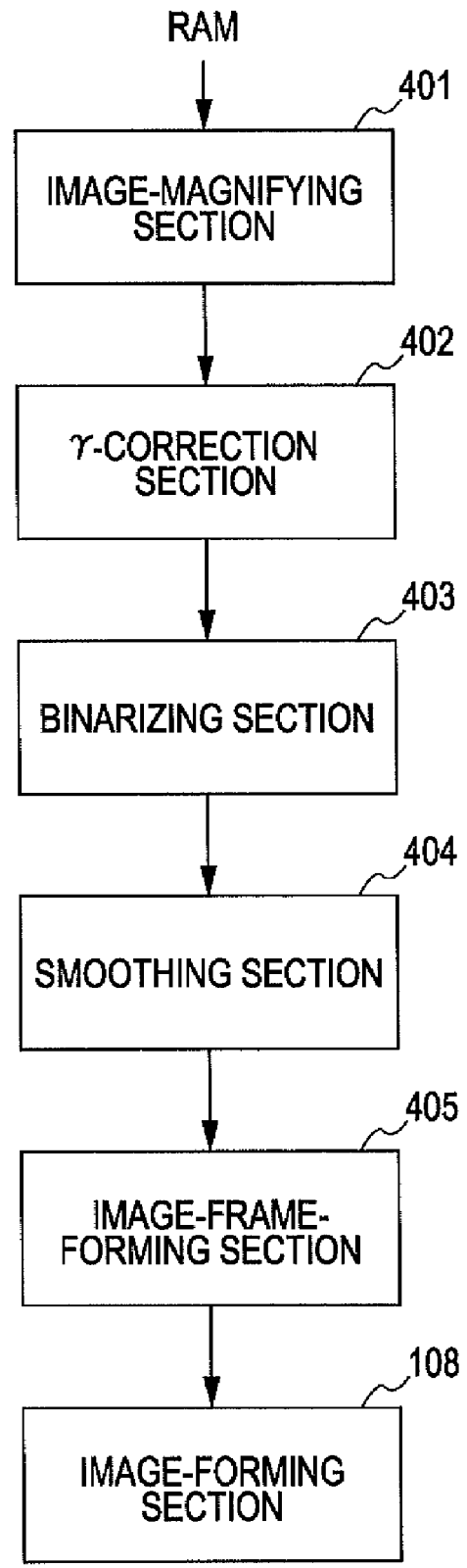
FIG. 4 is a block diagram of the image-processing section.

FIGS. 3 and 4 are block diagrams of the image-processing section 107. FIG. 3 illustrates processes prior to the image data obtained by the reading section 105 being stored in the RAM 103. The original images, formed on the CCD sensor in the image sensor 208 via the scanning mirrors 204, 205, and 206, and the lens 207, are input as luminance data of black, and converted into analog electrical signals by the CCD sensor. The converted image signals are input to an analog-signal-processing section (not shown), and processes such as sample-and-hold and black level correction are performed. The image signals are converted from analog signals into digital signals (A/D conversion) in an A/D-conversion section 301, and shading correction is performed on the digitalized signals. The shading correction is a process for correcting variations in sensitivity of the CCD sensor that reads the original documents and correcting light-distribution characteristics of the lamp for illuminating the original documents. Subsequently, the image signals are sent to a log-conversion section 302. The log-conversion section 302 has a look-up table (LUT) for converting the input luminance data into density data. The luminance data obtained by reading the original documents is converted into density data of the original images using values in the LUT corresponding to the input data, and the image data is stored in the RAM 103.

FIG. 4 illustrates a part of processes up to where images are formed on recording sheets by the image-forming section 108 on the basis of the image data stored in the RAM 103. The image data stored in the RAM 103 is first magnified to a desired size by an image-magnifying section 401 according to the size of recording sheets set using the operating section 104. The magnified image data is sent to a γ-correction section 402. The γ-correction section 402 does not output intact density information in the image data. The γ-correction section 402 performs LUT conversion with consideration of input-output characteristics of the image-forming section, and adjusts outputs according to density values specified via the operating section 104. Subsequently, a binarizing section 403 binarizes the 8-bit multilevel density data to 0 or 1.

The image data of the binarized density data is sent to a smoothing section 404. The smoothing section 404 interpolates the data such that the ends of the binarized images become smooth, and then sends the image data to an image-frame-forming section 405.

The image-frame-forming section 405 forms image frames according to the sheet sizes of recording sheets on which images are formed and to the sizes of margins, and applies the image frames on the image data output from the smoothing section 404. The image-frame-forming section 405 then deletes the image data protruding from the frames, i.e., protruding from sheet areas in which the images are formed. The image-frame-forming section 405 creates the image data according to the sheet sizes, and then outputs the image data to the image-forming section 108. The image-forming section 108 controls laser emission from the exposure-controlling unit 210 according to the image data and values of fine adjustment in image magnification (described below).

Figure 5:
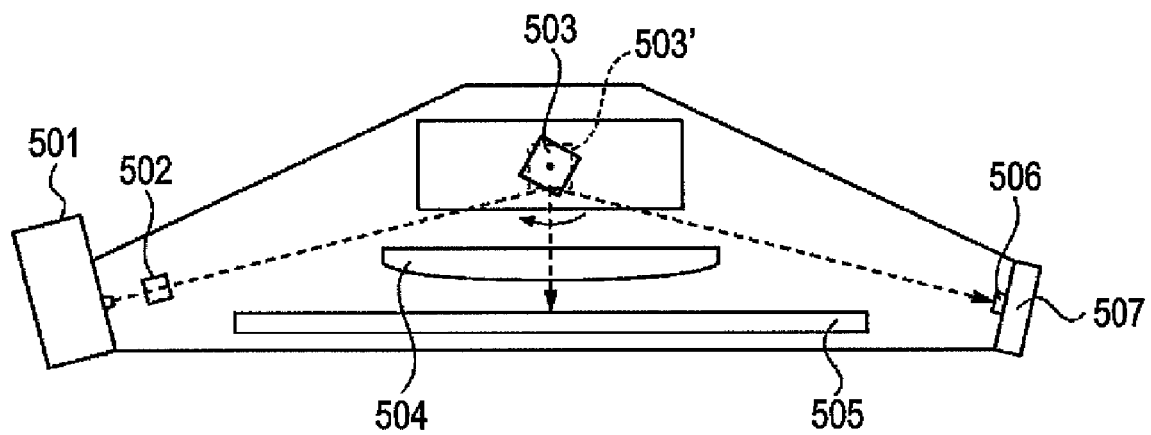
FIG. 5 illustrates a schematic view of an exposure-controlling unit.
Figure 6A:
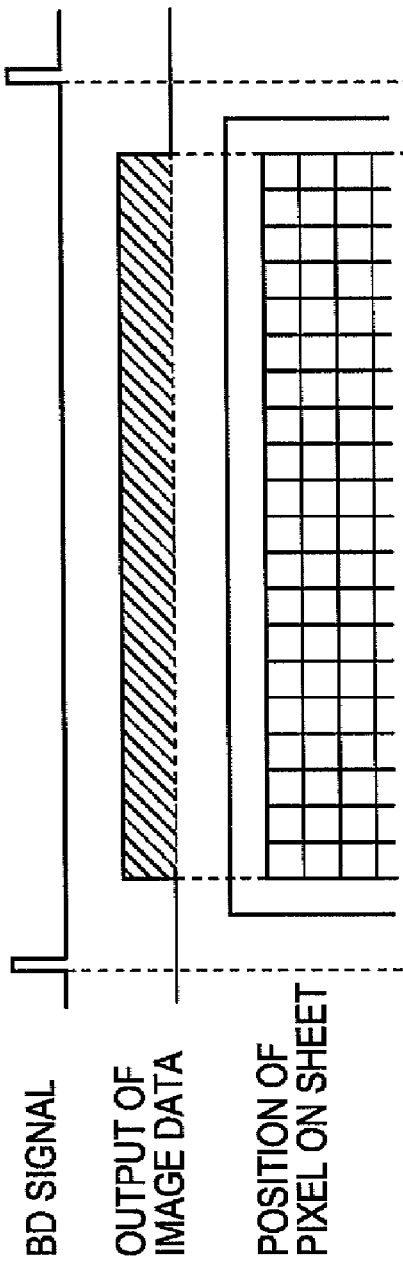
FIGS. 6A and 6B illustrate a fine adjustment in image magnification.
Figure 6B:
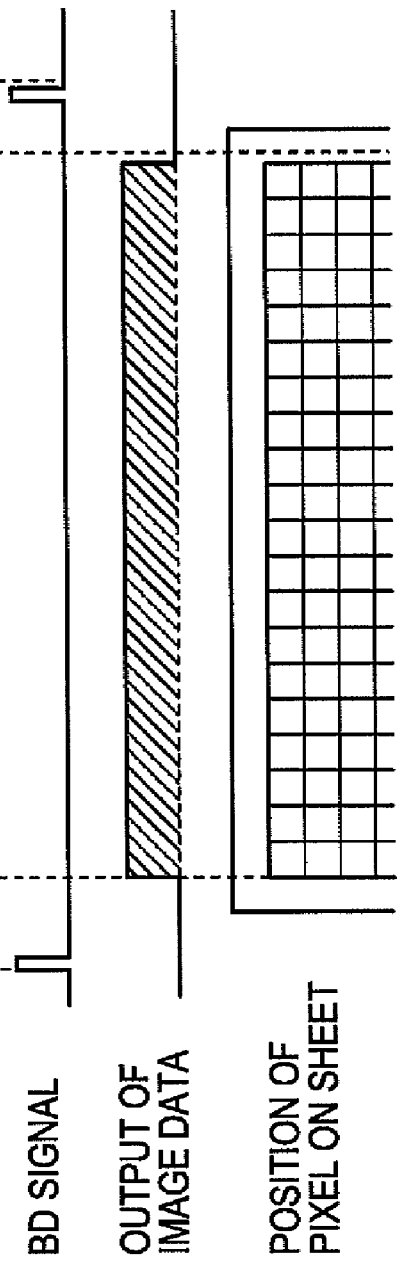

FIGS. 5, 6A and 6B illustrate how the image magnification is adjusted in fine increments in the exposure-controlling unit 210. FIG. 5 is a schematic view of the exposure-controlling unit 210. The exposure-controlling unit 210 includes a semiconductor laser 501, a cylindrical lens 502, a polygon mirror 503, a polygon motor that rotates the polygon mirror 503 (not shown), an fθ lens 504, a reflecting mirror 505, a beam-detecting (BD) lens 506, and a BD sensor 507.

Laser beams emitted from the semiconductor laser 501 are appropriately shaped by a collimator lens (not shown) and the cylindrical lens 502 before being applied to the photosensitive drum 211. The shaped laser beams are reflected by the polygon mirror 503 that is rotated at a high speed by the polygon motor (not shown), and shaped again by the fθ lens 504 such that the scanning speed over the photosensitive drum 211 becomes uniform. The laser beams re-shaped by the fθ lens 504 are reflected by the reflecting mirror 505, and scanned over the photosensitive drum 211.

The laser beams reflected by the polygon mirror 503 are scanned over the photosensitive drum 211 by using the rotation of the polygon mirror 503. In general, the BD sensor 507 is used for detecting the position of the scanning beams. When the BD sensor 507 detects the laser beams, the polygon mirror 503 is located at a position indicated by broken lines (503') shown in FIG. 5. Thus, the position of the scanning beams can be detected on the basis of the time from which the BD sensor 507 detects the laser beams and the rotational speed of the polygon mirror 503. With this detecting method, on-off control of laser beams is performed such that desired electrostatic latent images are formed on the photosensitive drum 211.

On the other hand, the BD sensor 507 may not detect the laser beams for a period of time while the laser beams are emitted from the semiconductor laser 501 and the polygon mirror 503 is rotated. In such a case, any of the components of the exposure-controlling unit 210 such as the semiconductor laser 501, the polygon mirror 503, and the BD sensor 507 can be in an abnormal condition, and in such a case it is determined that the exposure-controlling unit 210 is out of order. Herein, the BD lens 506 is attached to the surface of the BD sensor 507 so as to shape the incident laser beams.

Moreover, the BD sensor 507 is also used for controlling the rotational speed of the polygon mirror 503. When the polygon mirror 503 is stably rotated at a constant speed, the BD sensor 507 detects the laser beams at a constant period. That is, when the detecting timing of the laser beams by the BD sensor 507 is delayed compared with the predetermined time period, it is determined that the rotational speed of the polygon mirror 503 is reduced, and the speed of the polygon motor is controlled so as to be increased. On the other hand, when the detecting timing of the laser beams by the BD sensor 507 is advanced as compared with the predetermined time period, the speed of the polygon motor is controlled so as to be reduced.

Next, the fine adjustment in the image magnification will be described in detail with reference to FIGS. 6A and 6B. When a change in the image magnification is large, the image data is magnified in the image-magnifying section 401 in a digital manner. At this time, degradation of the images is unavoidable due to the change of the image data from the original data.

Therefore, when the change in the image magnification is small (in a range of ±3%, for example), fine adjustment is applied to the image data under the control of the exposure-controlling unit 210. For example, the exposure-controlling unit 210 adjusts the scanning speed of the laser determined from the rotational speed of the polygon mirror 503 and an image clock for turning the laser on or off according to the image data. With this, degradation of the images can be prevented since no changes need to be added to the image data.

FIG. 6A illustrates the detecting timing of the BD sensor and the output timing of the image data corresponding to the detecting timing when the image magnification is 100%. FIG. 6B illustrates the detecting timing of the BD sensor and the output timing of the image data corresponding to the detecting timing when the image magnification is less than 100%.

The intervals of the images in the sub-scanning direction are determined on the basis of the intervals of scanning lines of the laser. Since the moving speed of the photosensitive drum 211 is fixed, the intervals of the laser scanning lines can be reduced by increasing the speed of the polygon motor such that the scanning period of the laser becomes short. When the speed of the polygon motor is increased, the scanning speed in the main scanning direction is also increased. Therefore, the irradiation time of the laser per pixel needs to be reduced, i.e., the image clock during the laser irradiation need to be increased such that the intervals of the images on the photosensitive drum 211 are maintained in the main scanning direction.

The intervals of the images in the main scanning direction can be changed by increasing the image clock as described above. Thus, the image clock is changed by an amount required for changing the intervals in the main scanning direction in addition to an amount required for changing the intervals in the sub-scanning direction.

Next, calculation of a sheet length by repeatedly reading the information (density) on the surface of a sheet using a plurality of image sensors will be described with reference to FIGS. 7 to 10B.

First, measurement of a moving distance of a sheet by reading the surface of the sheet using an image sensor will be described. The image-sensing units 261 to 263 each include one or more image sensors so as to enable repeated reading of images of the sheet surface while the sheet is being carried.

Figure 7:
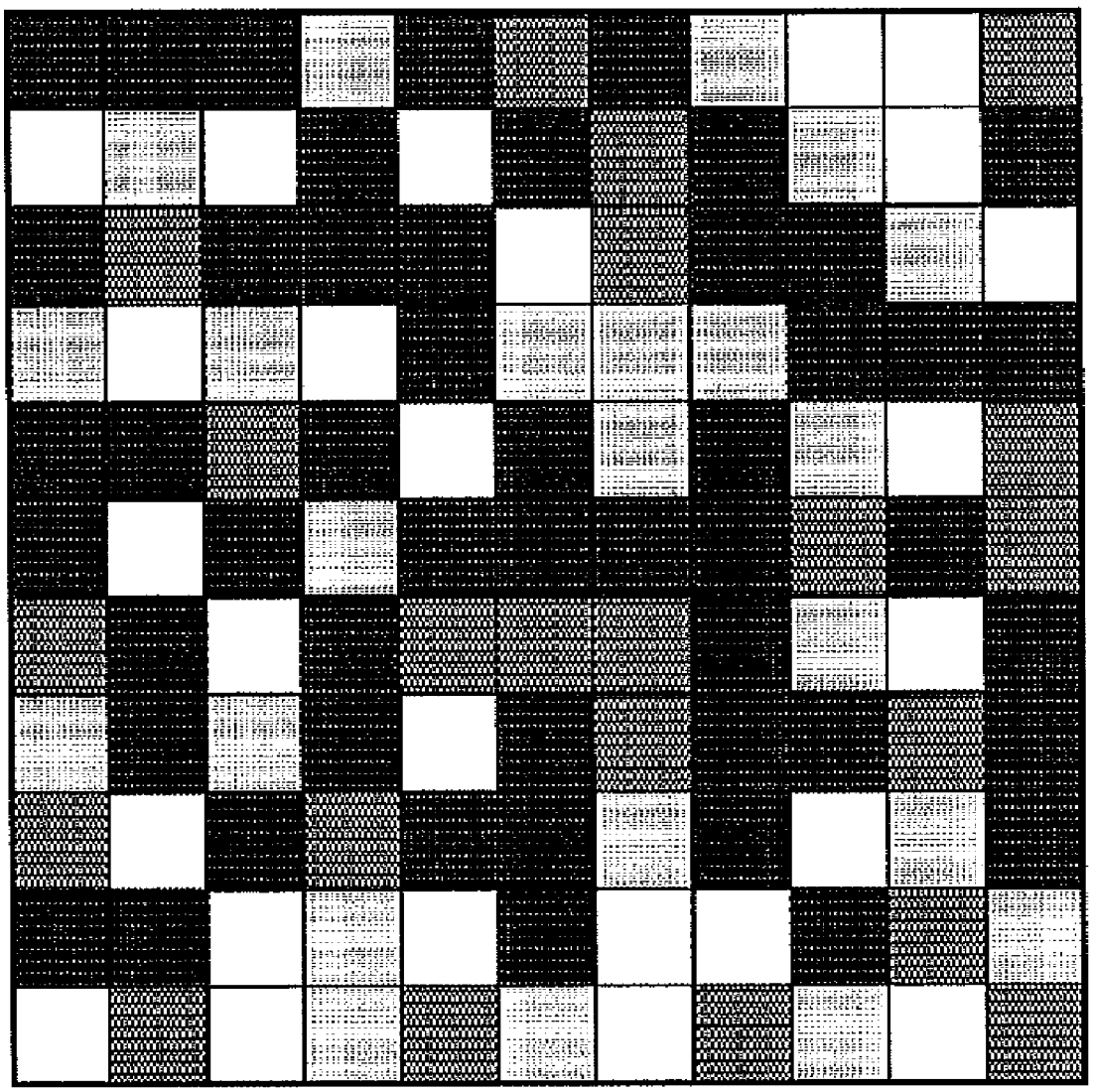
FIG. 7 illustrates an image of a sheet surface read using an image sensor.

The density of the sheet surface looks uniform to the unassisted eye. However, it is extremely rare that the density becomes perfectly uniform over the entire surface, and small differences in density are detected by image pickup devices such as CCD sensors. When a gain sufficient for emphasizing the density is applied to an input image, unevenness of the density on the sheet surface read by the image sensor can be visualized as shown in FIG. 7.

When the surface of the sheet is repeatedly read using the image sensor while the sheet is being carried, it is easily presumed that the image read in the latest reading operation can be the same as that obtained by moving the image read in the preceding reading operation in parallel with respect to the carrying direction of the sheet.

Figure 8:
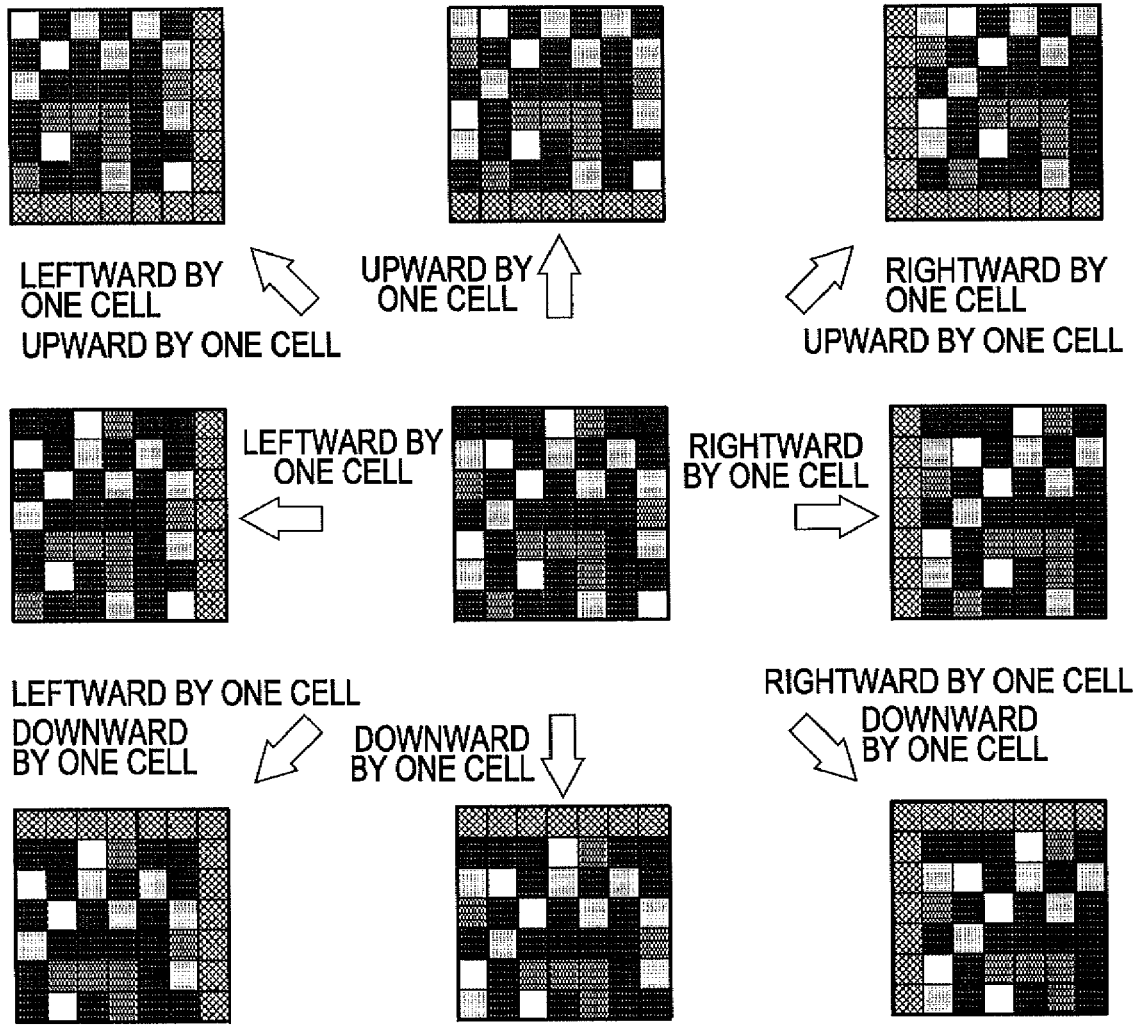
FIG. 8 illustrates patterns generated by translating the read image.

Therefore, when the surface of the sheet is read using the image sensor, patterns generated by moving an obtained image vertically and horizontally are prepared as shown in FIG. 8, and compared with a pattern of an image obtained in the next reading operation. With this, the direction along which the sheet is moved from the position in the preceding reading operation to the position in the latest reading operation can be determined. Herein, crosshatched portions in FIG. 8 indicate cells without density data created by the translation of the image, and these cells are not used for comparison.

A method for comparing image patterns according to this exemplary embodiment will now be described with reference to FIG. 9.

An image read using the image sensor is converted from analog data into digital data in a corresponding photodetector, and the converted density data is stored in a density matrix A shown at the left side in FIG. 9. On the other hand, nine pieces of density data, which include eight pieces of data created by vertically and horizontally translating the image read in the preceding reading operation in eight directions by one cell as shown in FIG. 8 and a piece of data that is kept intact, have been prepared as comparative matrices. These nine pieces of density data are stored in a density matrix B shown at the right side in FIG. 9 one by one so as to enable comparison with the density matrix A.

For comparison, differences in density between cells in the density matrix A and the corresponding cells in the density matrix B are squared, and the sum of these differences for all the effective pixels is calculated using a computational expression shown in FIG. 9. Since the comparative matrix is created by translating the image read in the preceding reading operation by one block at the maximum, the area of the effective pixels becomes a size one-block-line smaller than the read image vertically and horizontally. In FIG. 9, shaded cells A22 to A66 and B22 to B66 indicate the effective pixels. In this exemplary embodiment, the translation is performed by one cell at the maximum. However, as a matter of course, the translation can be performed by two cells at the maximum. In that case, the effective pixels are reduced correspondingly. Moreover, when the sheet is moved upward, for example, the image read in the latest reading operation cannot be shifted downward compared with the image read in the preceding reading operation since the area to be read using the image sensor is always moving while the sheet is being carried. Therefore, the image shifted downward can be removed from the comparative matrices that are obtained by translating the image read in the preceding reading operation vertically and horizontally so as to reduce the calculation time.

From this calculation result, it is determined that the image pattern having the smallest total sum of the squared density differences in the effective pixels is most similar to the pattern of the image data that is read in the latest reading operation. Thus, the moving distance from the image read in the preceding reading operation, which is the original data of this pattern, to the image read in the latest reading operation is obtained.

Next, calculation of the length of the sheet from moving distances obtained using a plurality of image sensors will be described.

As described above, the moving distance of the sheet during each reading operation using an image sensor is determined in units of pixels of the image sensor. However, the reading accuracy of the image sensor is not sufficient for practical purposes since the distance between the surface of the sheet and the image sensor that detects the surface of the sheet is unstable according to the movement of the sheet when a sheet is detected between rollers on a carrying path. This variation in distance changes the detected density, and thus effects on the moving distance that is finally obtained.

Therefore, a plurality of image sensors are disposed so as to be spaced from each other in the main scanning direction and in the sub-scanning direction, and the moving distance that is determined from the most frequent detecting result of the plurality of image sensors is adopted such that the moving distance of the sheet is detected with a stable accuracy.

Figure 10A:
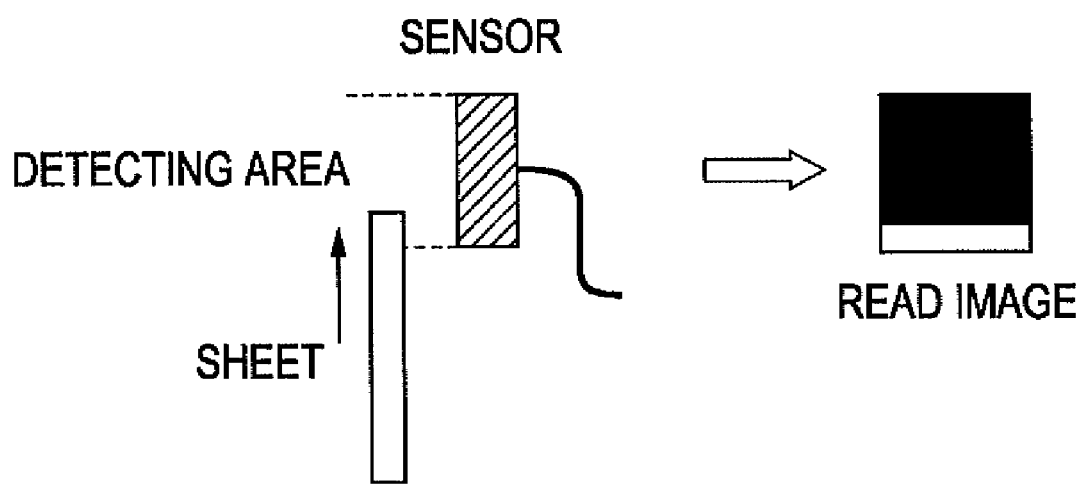
FIGS. 10A and 10B illustrate the detecting timings of the leading end and the trailing end of a sheet.
Figure 10B:
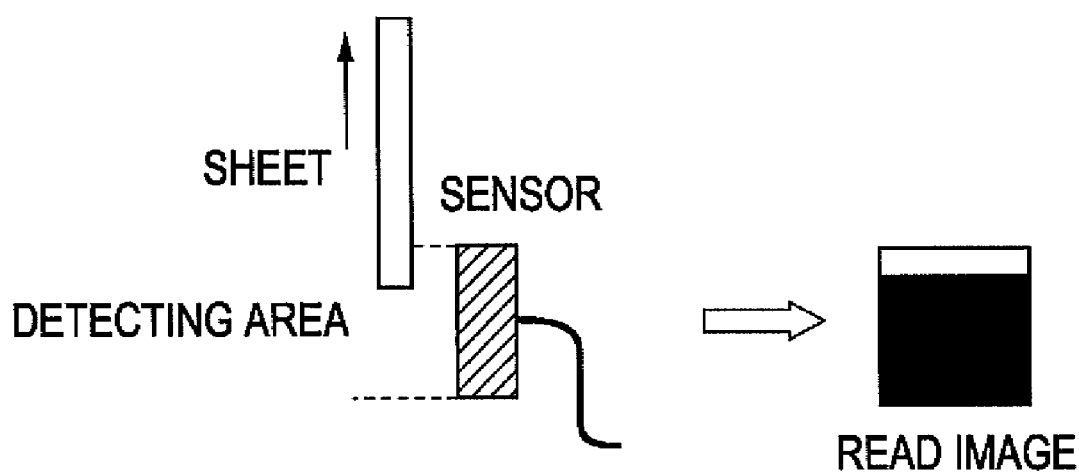

Next, a method for detecting the leading end and the trailing end of the sheet using an image sensor will be described. Repetitive reading operation using the image sensor is started shortly before the leading end of the sheet enters the reading area of the image sensor. At this time, the image read using the image sensor is entirely black as a result of reading a background since the sheet has yet to reach the reading area of the image sensor. Subsequently, when the sheet enters the reading area of the image sensor, a part of the reading area becomes white or gray as a result of reading a part of the sheet, and density other than black is detected. Thus, this position is determined as the leading end (FIG. 10A). In contrast, when the trailing end of the sheet enters the reading area of the image sensor, the area behind the trailing end of the sheet is detected as black (FIG. 10B). Finally, when the entire reading area of the image sensor becomes black, it is determined that the trailing end has passed through.

In this manner, the arrival timing of the leading end and the trailing end of the sheet at a reference position of the image sensor can be detected by repeatedly reading the images from when the image sensor detects the leading end of the sheet to when the trailing end of the sheet passes through. With this, the length of the sheet in the carrying direction can be determined in the unit of reading accuracy of the image sensor by summing all the moving distances of the sheet during the period from when the leading end of the sheet reaches the reference position of the image sensor to when the trailing end passes through the reference position.

Finally, fine adjustment of the image magnification during two-sided copying will be described.

Users set a printing condition that both sides of original documents disposed on the ADF 280 are read for two-sided printing on sheets supplied from the right cassette deck 221 via the operating section 104, and then initiate the start of copying.

The reading section 105 receiving the command controls the ADF 280, the scanner 202, and the like so as to read the original documents, and stores the obtained images in the RAM 103.

On the other hand, the paper-feeding section 110 feeds a sheet accommodated in the right cassette deck 221, and the carrying section 111 carries the sheet to the image-forming unit 209. At this time, the measuring section 109 measures the length of the sheet in the sub-scanning direction using the image sensor 261.

The image-forming unit 209 forms a toner image on the basis of the image data stored in the RAM 103, and transfers the image on the sheet. Subsequently, the sheet is carried to the fixing device 235 such that the transferred toner image is fixed on the sheet.

The sheet having the toner image fixed on one of the surfaces thereof in this manner is then carried on the reversing path 239 and the lower carrying path 240 by the carrying section 111, and sent to the paper-refeeding path 241. When the sheet is sent to the paper-refeeding path 241, the measuring section 109 measures the length of the sheet in the sub-scanning direction using the image sensor 262, the length of the sheet being changed after passing through the fixing device 235. With this, the rate of change in the length of the sheet in the sub-scanning direction caused by the passage of the sheet through the fixing device 235 can be determined. The image sensor 262 is disposed at a position sufficiently remote from the image-forming unit 209 so as to detect the trailing end of the sheet before the laser beams 219 are emitted to the photosensitive drum 211.

The rate of change in the length of the sheet in the sub-scanning direction is sent to the image-forming section 108. The image-forming section 108 changes the image size according to the change in the size of the sheet during the image-forming operation on the sheet re-fed from the paper-refeeding path 241 by changing the image clock of the polygon motor as described above.

In this manner, the position of the image on the back surface of the sheet can be adjusted to that on the front surface by changing the image size by the change in the size of the sheet.

As described above, the digital copier according to the first exemplary embodiment includes a plurality of image sensors serving as area sensors disposed on the carrying paths of the sheets so as to enable comparison of density between images that are obtained by repeatedly reading a sheet from the leading end to the trailing end of the sheet using the image sensors while the sheet is being carried. Then, the length of the sheet in the carrying direction is accurately calculated from the comparative result, and the variation in the length of the sheet in the carrying direction after the sheet passes through the fixing unit is determined from the calculation result. Thus, the size of the image formed in the second image-forming operation can be appropriately corrected.

Second Exemplary Embodiment

Next, a second exemplary embodiment will be described. A cross-sectional view, functions, structures, and the like of a digital copier according to this exemplary embodiment are the same as in the first exemplary embodiment, and have been described in detail. Therefore, only differences from the first exemplary embodiment will be described.

In the digital copier according to this exemplary embodiment, the image-sensing units 261, 262, and 263 each include only one image sensor. Moreover, the image-sensing units are disposed between the shafts of the carrying rollers as shown in a three-view drawing in FIG. 11.

Figure 11:
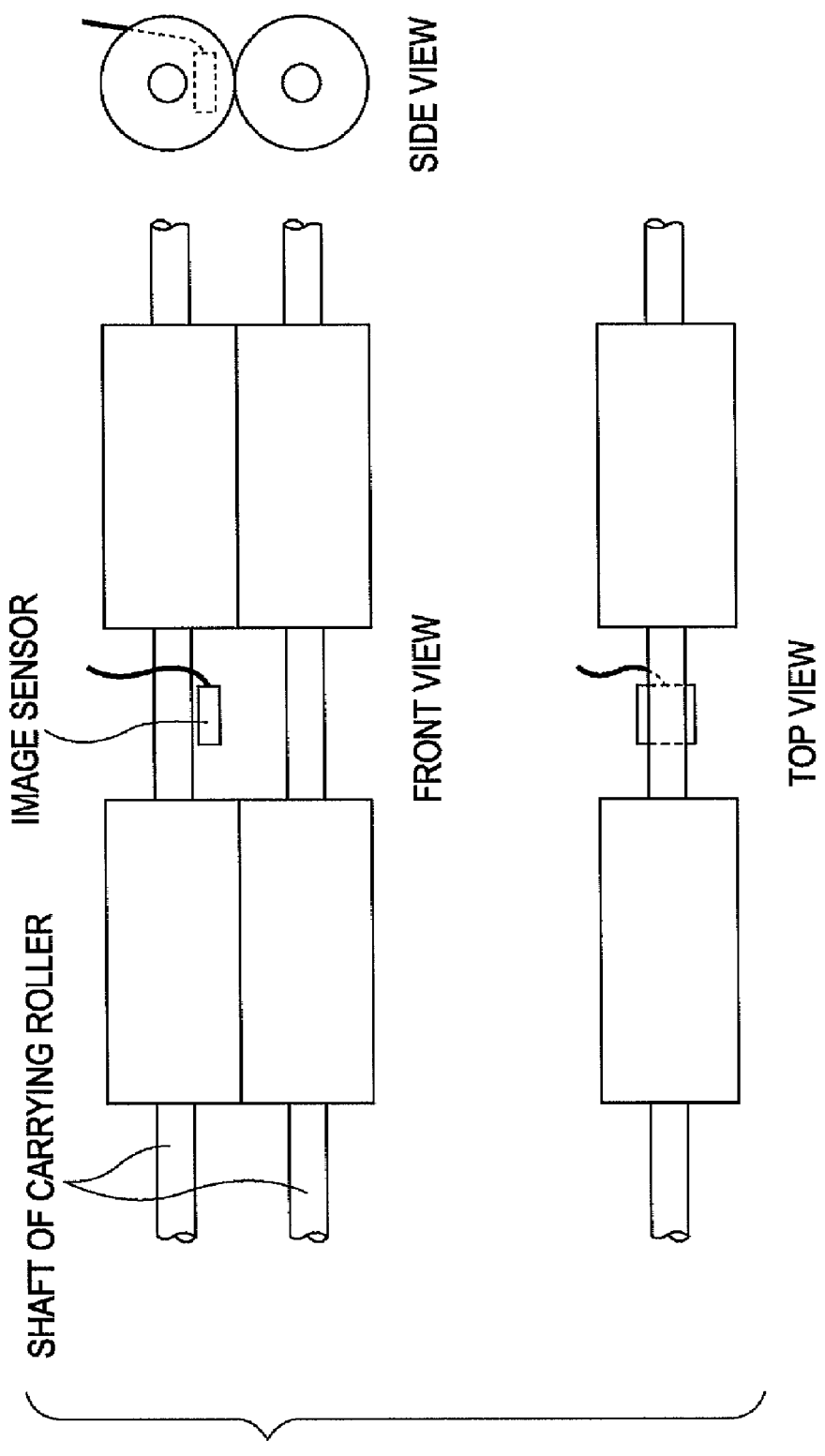
FIG. 11 illustrates the layout of an image sensor according to a second exemplary embodiment of the present invention.

The image-sensing units arranged as shown in FIG. 11 can always read the surfaces of the sheets at the positions where the sheets are nipped between the rollers. With this, the movement of the sheets is stabilized, and the reliability of density read using the image-sensing units can be improved.

Thus, unlike the first exemplary embodiment, a sufficient accuracy can be obtained using only one image sensor.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the priority of Japanese Patent Application No. 2005-360654 filed Dec. 14, 2005, which is hereby incorporated by reference herein in its entirety.

What is claimed is:

1. A measuring device for measuring a length of a sheet, comprising:
   a sheet-carrying unit configured to carry a sheet in a carrying direction;
   a reading unit including an area sensor and configured to repeatedly read the surface of the sheet from the leading end to the trailing end of the sheet while the sheet is being carried by the sheet-carrying unit; and
   a measuring unit measuring the length of the sheet in the carrying direction on the basis of information regarding the sheet surface that is repeatedly read by the reading unit,
   wherein the measuring unit measures a moving distance of the sheet during a time period from a preceding reading operation by the reading unit to a current reading operation by the reading unit on the basis of a comparison between the information regarding the surface of the sheet read in the current reading operation and the information regarding the surface of the sheet read in the preceding reading operation,
   wherein the reading unit is disposed on the carrying path, and
   wherein, in a case in which the reading unit includes a plurality of reading units, the measuring unit determines moving distances of the sheet based on the most frequent detecting result of the plurality of reading units.

2. The measuring device according to claim 1, wherein the sheet-carrying unit comprises a plurality of roller pairs, and wherein the reading unit is disposed between the rollers of each roller pair having the sheet nipped therebetween.

3. An image forming apparatus comprising:
   the measuring device according to claim 1;
   an image-correcting device configured to correct an image to be formed on the sheet;
   an image-forming device configured to form a toner image on the sheet on the basis of the image corrected by the image-correcting device; and
   a fixing device fixing the toner image formed on the sheet by the image-forming device to the sheet,
   wherein the measuring unit measures the length of the sheet in the carrying direction before and after the sheet passes through the fixing device, and
   wherein the image-correcting device determines a correction factor according to the length of the sheet in the carrying direction measured by the measuring unit before and after the sheet passes through the fixing device.

4. The image forming apparatus according to claim 3, wherein
   the image-forming device includes an image-bearing member configured to support an electrostatic latent image on the surface thereof, a laser-emitting unit configured to irradiate the image-bearing member with laser beams, a polygon mirror that reflects the laser beams emitted from the laser-emitting unit, and a driving unit that drives the polygon mirror, and
   a speed of the driving unit is changed according to the correction factor of the image determined by the image-correcting device.

5. The image forming apparatus according to claim 4, further comprising an image clock that is changed according to the correction factor of the image determined by the image-correcting device during laser irradiation by the laser-emitting unit.

6. A measuring device for measuring a length of a sheet, comprising:
   a sheet-carrying unit configured to carry a sheet in a carrying direction;
   a reading unit including an area sensor and configured to repeatedly read the surface of the sheet from the leading end to the trailing end of the sheet while the sheet is being carried by the sheet-carrying unit; and
   a measuring unit measuring the length of the sheet in the carrying direction on the basis of information regarding the sheet surface that is repeatedly read by the reading unit,
   wherein the measuring unit measures a moving distance of the sheet during a time period from a preceding reading operation by the reading unit to a current reading operation by the reading unit on the basis of a comparison between the information regarding the surface of the sheet read in the current reading operation and the information regarding the surface of the sheet read in the preceding reading operation,
   wherein the reading unit is disposed on the carrying path, and
   wherein, in a case in which the reading unit includes a plurality of reading units, the measuring unit determines moving distances of the sheet at positions of the reading units from reading results of the corresponding reading units based on an average of the moving distances determined from the reading results of all the reading units for measuring the length of the sheet.

7. An image forming apparatus comprising:
   the measuring device according to claim 6;
   an image-correcting device configured to correct an image to be formed on the sheet;
   an image-forming device configured to form a toner image on the sheet on the basis of the image corrected by the image-correcting device; and
   a fixing device fixing the toner image formed on the sheet by the image-forming device to the sheet,
   wherein the measuring unit measures the length of the sheet in the carrying direction before and after the sheet passes through the fixing device, and
   wherein the image-correcting device determines a correction factor according to the length of the sheet in the carrying direction measured by the measuring unit before and after the sheet passes through the fixing device.

* * * * *